(12) United States Patent
Takasu (10) Patent No.: US 6,279,157 B1
(45) Date of Patent: Aug. 21, 2001

(54) PROGRAM DATA TRANSMISSION CHECKING METHOD AND APPARATUS

(75) Inventor: Nobuyuki Takasu, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/026,302

(22) Filed: Feb. 19, 1998

(30) Foreign Application Priority Data

Mar. 4, 1997 (JP) .................................................. 9-049308

(51) Int. Cl.⁷ .............................. H04N 9/00; H04N 7/16
(52) U.S. Cl. .................................. 725/22; 725/9; 725/20
(58) Field of Search .................................. 348/1–4, 722, 348/907; 725/1–22

(56) References Cited

U.S. PATENT DOCUMENTS

| | | | |
|---|---|---|---|
| 5,450,122 | * 9/1995 | Keene | 348/1 |
| 5,526,427 | * 6/1996 | Thaomas et al. | 380/20 |
| 5,584,050 | * 12/1996 | Lyons | 348/1 |
| 5,650,994 | * 7/1997 | Daley | 370/259 |
| 5,737,025 | * 4/1998 | Dougherty et al. | 348/2 |
| 5,826,165 | * 10/1998 | Echeita et al. | 455/2 |
| 5,850,249 | * 12/1998 | Massetti et al. | 348/1 |

* cited by examiner

Primary Examiner—Andrew Faile
Assistant Examiner—Hai V. Tran
(74) Attorney, Agent, or Firm—Frommer Lawrence & Haug, LLP.; William S. Frommer; Joe H. Shallenburger (57) ABSTRACT

To obtain unique identification data to be added to program data even if different encoders are used, identification data generated by adding serial data specific to an encoder to data (time code) indicating the time of encoding is inserted into program data to be stored in a storage device. Whether the program data has been transmitted is checked based on the thus-generated identification data. By virtue of the use of such an identification data, even if program data are produced at the same time point by using different encoders, they can be clearly distinguished from each other because they are associated with different identification data because serial data of the encoders are different.

7 Claims, 7 Drawing Sheets

ENCODING STARTS AT 10 HOURS 45 MINUTES 26 SECONDS OF FEBRUARY 5, 1997 (WED). JST : (MACHINE ID = 4a : 57 : 23)

| 4a : 57 : 23 | + | 32 : f7 : e6 : 3e | = | 4a : 57 : 23 : 32 : f7 : e6 : 3e |

MAC ADDRESS (24 BITS)   ENCODING START TIME (32 BITS)   IDENTIFICATION DATA (56 BITS)

ENCODING STARTS AT 10 HOURS 53 MINUTES 22 SECONDS OF FEBRUARY 5, 1997 (WED). JST : (MACHINE ID = 4a : 57 : 23)

| 4a : 57 : 23 | + | 32 : f7 : e8 : 12 | = | 4a : 57 : 23 : 32 : f7 : e8 : 12 |

MAC ADDRESS (24 BITS)   ENCODING START TIME (32 BITS)   IDENTIFICATION DATA (56 BITS)

PROGRAM DATA TRANSMISSION CHECKING METHOD AND APPARATUS

BACKGROUND OF THE INVENTION

The present invention relates to a program data transmission checking apparatus suitable for use in a transmission system of program data such as that of a commercial message. Specifically, in a system in which whether a program has been transmitted is checked by using identification data that is added to transmission data, it is intended to generate identification data having no possibility of duplicated generation and add it to transmission data by generating the identification data by using data indicating the time of an encoding process and a serial number specific to an encoder used for the encoding process.

In broadcasting programs, they need to be identified. This will be explained below for the case of commercial broadcast. In commercial broadcast, commercial messages are broadcast in the midst of each program. Usually, program data of commercial messages and the like are edited, subjected to compression coding of MPEG2, for instance, and then stored in a commercial server, for instance. Those program data are read out from the server and broadcast in a desired manner according to a program transmission list.

In checking, for the purpose of charging or the like, whether a commercial message has been broadcast, specific identification data added to the commercial message is used. Therefore, identification data assigned to respective commercial messages to be handled by a certain broadcasting apparatus should be unique to the respective commercial messages. If identification data are used in a duplicated manner, the number of times of broadcast of each program cannot be recognized correctly and hence charging data becomes incorrect.

In view of the above, conventionally it is a common procedure to use automatically generated data as identification data. This is because type-in identification data produced by an operator has a considerably high risk of duplicated generation. For example, an automatic generation process is known which uses the encoding time (for instance, the encoding start time) of encoding a commercial message program. This may be done by utilizing time information of a clock that is incorporated in an encoder. That is, the time information is used as identification data and is added to program data of commercial messages, movies, etc.

In addition to a case in which program data of commercial messages are compression-coded by an encoder incorporated in a commercial server and then stored in the commercial server, there is another case in which program data are encoded by an encoder that is outside the commercial server. Therefore, there is a possibility that program data processed by different encoders are stored in the commercial server.

Where different encoders are used, commercial messages may be encoded at the same time point of the same day, which leaves a possibility that the same identification data is generated for different commercial messages.

SUMMARY OF THE INVENTION

The present invention has been made to solve the above problem in the art, and an object of the invention is therefore to provide a program data transmission checking apparatus that facilitates checking whether program data has been transmitted by enabling identification data unique to the program data to be added to it.

The invention provides a program data transmission checking apparatus for checking whether program data has been transmitted, comprising identification data generating means for generating unique program identification data; encoding means for encoding program data together with the program identification data corresponding to the program data; decoding means for decoding encoded data that is output from the encoding means; and output means for outputting decoded program identification data that is output from the decoding means.

In the above program data transmission checking apparatus, the program identification data may include time data relating to an encoding process and data specific to the encoding means.

The above program data transmission checking apparatus may further comprise input means for allowing external input of program data and program identification data corresponding to the program data.

According to another aspect of the invention, there is provided an apparatus for generating identification data to be used for checking whether program data transmission information coincides with actually transmitted program data, comprising identification data generating means for generating unique program identification data; first output means for outputting the program identification data to encoding means for encoding program data together with the program identification data corresponding to the program data; and second output means for outputting the program identification data to transferring means for transferring the program identification data generated by the identification data generating means.

According to another aspect of the invention, there is provided a comparing apparatus for checking whether program data transmission information coincides with actually transmitted program data, comprising first input means for receiving data that is output from transferring means for transferring program identification data generated by identification data generating means for generating unique program identification data; second input means for receiving data that is output from decoding means for decoding encoded data that is output from encoding means for encoding program data together with the program identification data corresponding to the program data; and comparing means for comparing the program identification data that has been transferred via the transferring means with decoded program identification data that is output from the decoding means.

According to a further aspect of the invention, there is provided a program data transmission checking method for checking whether program data transmission information coincides with actually transmitted program data, comprising the steps of generating unique program identification data; transferring the program identification data; encoding program data together with the program identification data corresponding to the program data to produce encoded data; decoding the encoded data to produce decoded program identification data; and comparing the transferred program identification data with the decoded program identification data.

According to still another aspect of the invention, there is provided a program data transmission checking apparatus for checking whether program data transmission information coincides with actually transmitted program data, comprising identification data generating means for generating unique program identification data; encoding means for encoding program data together with the program identification data corresponding to the program data; decoding means for decoding encoded data that is output from the encoding means; transferring means for transferring the program identification data generated by the identification data generating means; and comparing means for comparing the program identification data that has been transferred via the transferring means with decoded program identification data that is output from the decoding means.

DETAILED DESCRIPTION OF THE PREFERRED EMBODIMENT

A data transmission checking apparatus according to an embodiment of the present invention, i.e., a checking system used in broadcasting commercial messages, will be hereinafter described in detail with reference to the accompanying drawings.

Figure 1:
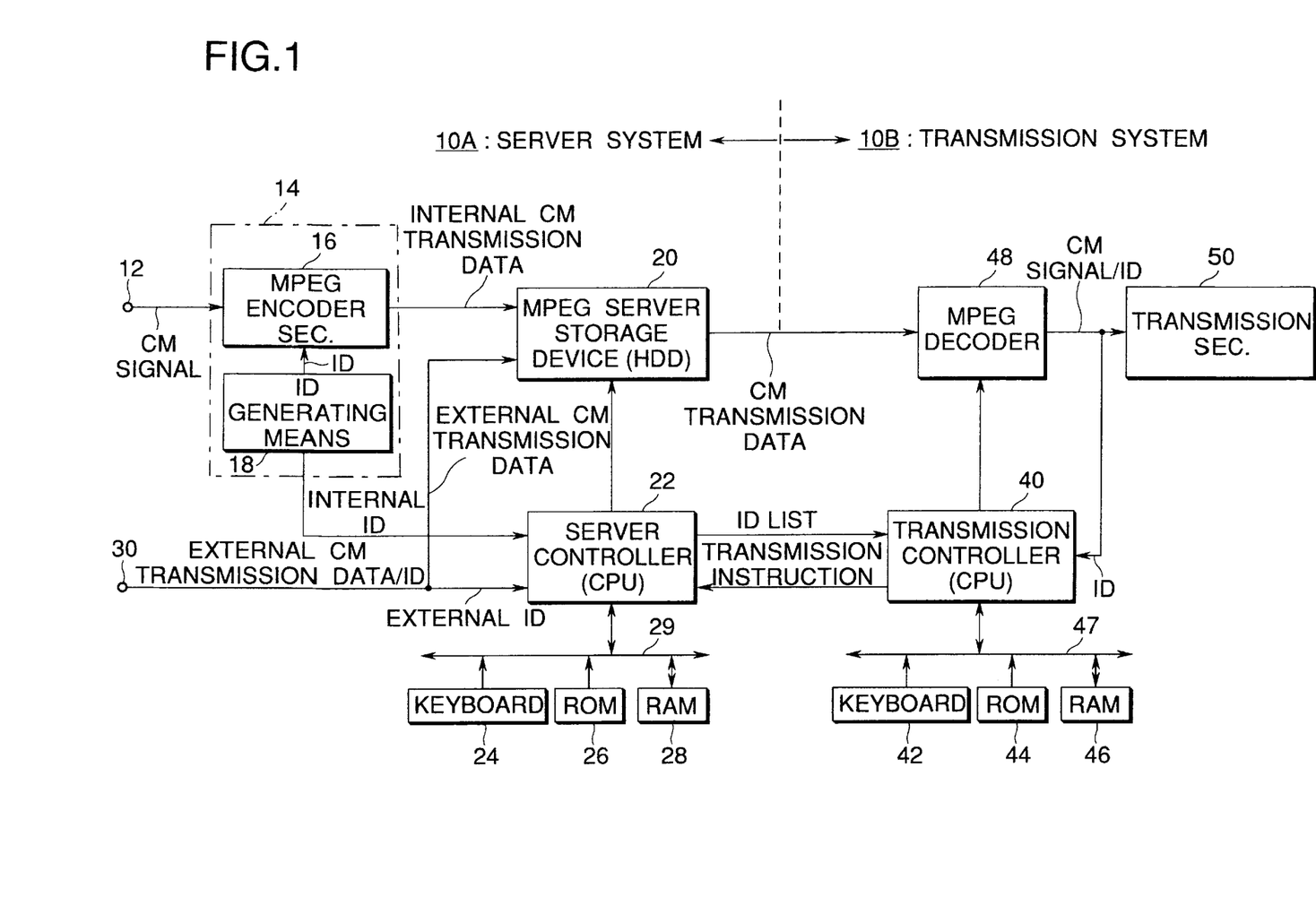
FIG. 1 is a system diagram showing the main part of a program data transmission checking apparatus according to an embodiment of the present invention.

As shown in FIG. 1, the data transmission checking apparatus according to the embodiment consists of a server system 10A and a program data transmission system 10B. In this embodiment, the checking apparatus itself constitutes part of a LAN and is capable of both accessing and being accessed by other terminals via an Ethernet.

The server system 10A will be described first. A program signal to be transmitted, which includes a video signal and an audio signal, is supplied to a terminal 12. In this embodiment, a program signal of a commercial message (hereinafter referred to as a CM signal) is supplied.

The CM signal is supplied to an encoder 14 for compression coding. Since this embodiment is directed to a case where a CM signal is compression-coded according to MPEG2, the encoder 14 is provided with an MPEG encoder section 16 which produces coded data that conforms to the MPEG format by executing a known compression and coding process. The encoder 14 is also provided with an identification data generating means 18 which automatically generates unique identification data ID. A specific example of the identification data generating means 18 will be described later.

The reason why identification data ID having a predetermined number of bits is generated automatically is to avoid duplicated generation of identification data ID. Where an operator inputs identification data ID, duplicated values may occur at a considerably high probability due to an input error.

The automatically generated identification data ID is inserted into a user area that is provided in the MPEG format. CM transmission data, i.e., coded data for program transmission in which the identification data ID is inserted, is given a file name that is specified by a server controller 22 (including a CPU) or input through a keyboard 24, and then stored in an MPEG server storage device 20 at a predetermined area. The server storage device 20 may be a hard disk drive HDD having large capacity.

The operation of each of the server storage device 20 and the encoder 14 is managed by the server controller 22. The known keyboard 24, a memory (ROM) 26 for storing, for instance, control programs for a program data storage process, a working memory (RAM) 28, and other devices are connected to the controller 22 via a bus 29.

The identification data ID that has been automatically generated by the identification data generating means 18 is supplied to the controller 22 and then stored in the RAM 28 together with its given file name as an entry of an ID list. The above-described process is for CM transmission data that is generated internally.

The server system 10A also has an external input terminal 30. The server storage device 20 can process not only CM transmission data generated by the encoder 14 that is provided within the server system 10A but also CM transmission data that is input via the external input terminal 30. Where CM transmission data generated externally is to be stored, it is input via the external input terminal 30.

In such a case, only coded data that has been generated according to the MPEG format in the above-described manner to which identification data ID automatically generated according to a predetermined format is inserted is accepted as external CM transmission data to be supplied to the terminal 30. This is because coded data (program data) cannot be identified without identification data ID. A file name is specified for or automatically given to the external CM transmission data through involvement of the controller 22, and the external CM transmission data is then stored in the storage device 20.

Whereas the external CM transmission data is stored in the server storage device 20, the corresponding identification data ID is supplied to the server controller 22. The external CM transmission data is given file name that has been input through the keyboard 24 or generated automatically, and a combination of the file name and the identification data ID is stored in the RAM 28 as an ID list entry.

The ID list stored in the RAM 28 includes file names and identification data IDs of CM transmission data that have been generated by the encoder 14 and those of CM transmission data that have been input via the external input terminal 30. The ID list is transferred to a transmission controller (including a CPU) 40 of a program data transmission system 10B and then stored in a RAM 40 that is connected to the transmission controller 40.

In conjunction with the CPU of the transmission controller 40, a keyboard 42, a ROM 44, and the RAM 46 are connected to the transmission controller 40 of the transmission system 10B via a bus 47. The ROM 44 stores a program transmission list, an identification data collation program, etc. The program transmission list is information necessary for transmission of programs; programs are transmitted based on this information.

An MPEG decoder 48 decodes CM transmission data while being controlled by the transmission controller 40 according to program transmission software. To effect the decoding of the MPEG decoder 48, a CM transmission data transmission instruction etc. are made to the server controller 22. A decoded CM signal is supplied to a program transmission section 50, which transmits the commercial message with proper timing (i.e., at a proper time point).

The decoder 48 decodes and outputs, in addition to the CM signal, the identification data ID that is inserted in the coded data. The identification data ID is detected by the transmission controller 40 and then collated with the identification data IDs of the ID list according to the identification data collation program (described later in detail).

The identification data generating means 18 has a time counter, which counts up the time every second starting from a predetermined date and time (for instance, Jan. 1, 1970; AM 0 hour, 0 minute, 0 second). For example, time data that is output from the time counter is 32-bit data. It takes 135 years for the count of the time counter to return to 0. Therefore, by using this time data as identification data ID, as long as internally generated CM transmission data are concerned, respective identification data IDs that are added to substantially all program data should be unique ones.

The reason why the above-described time counter is used rather than a counter that counts up the value for each encoding operation is that the use of the time counter has an advantage that even if it is reset for a certain reason a possibility of generating a plurality of time data as the same identification data ID is very low.

Further, to make respective identification data IDs that are added to program data unique ones also with respect to externally input CM transmission data, serial data that is specific to the encoder 14 is used in addition to the above-mentioned time data to constitute identification data ID. Where the program data transmission checking apparatus constitutes part of an Ethernet as mentioned above, each terminal connected to the Ethernet is given specific serial data (MAC address). Therefore, the encoder 14 of the server system 10A and an encoder that is used in generating CM transmission data externally are given different MAC addresses (for instance, 24-bit data).

Figure 2:
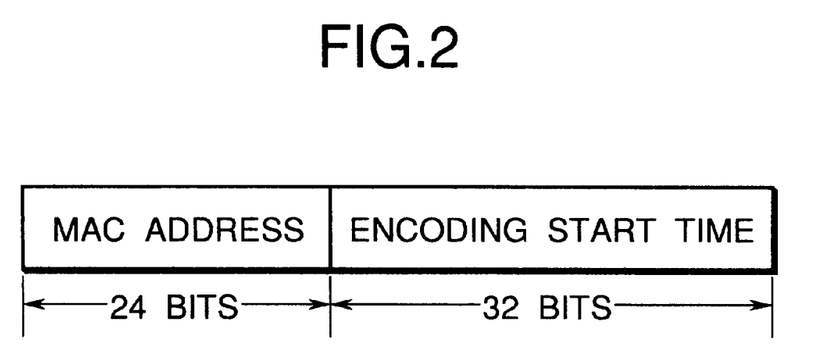
FIG. 2 shows an example structure of identification data.
Figure 3A:
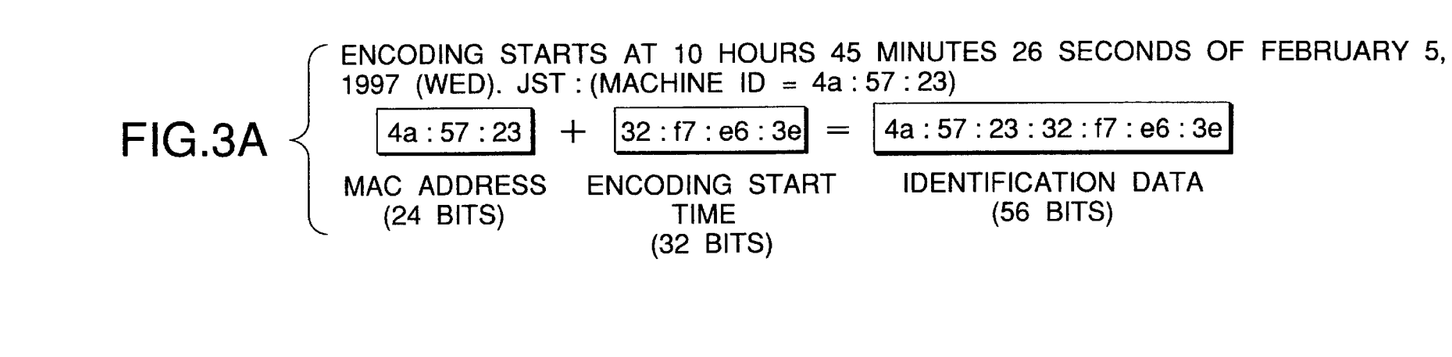
FIGS. 3A and 3B show specific examples of identification data.
Figure 3B:
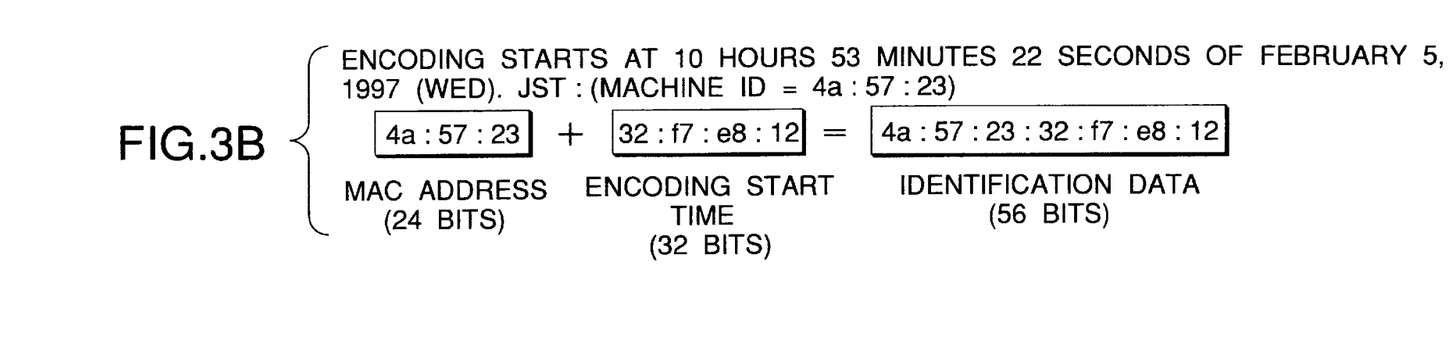

In consideration of the above, as shown in FIG. 2, data of 56 bits in total that is a combination of 32-bit time data and a 24-bit MAC address is generated as identification data ID. For example, in a case where encoding starts at AM 10 hours 45 minutes 26 seconds of Feb. 5, 1997, identification data ID as shown in FIG. 3A is generated. Where encoding starts at AM 10 hours 53 minutes 22 seconds of the same day, identification data as shown in FIG. 3B is generated which has the same MAC address as the identification data ID of FIG. 3A and different time data than it.

Therefore, even if the encoder 14 and an external encoder happen to start encoding at the same time point (same in all of hour, minute, and second) of the same day, different MAC data are generated because the encoders are different. In this manner, unique identification data IDs can be given to respective program data.

Where coded data is generated by using an encoder that is not directly related to an Ethernet, a manufacture number, a maker number, and a combination thereof, etc. may be used instead of the MAC address. In this case, an operation for enabling such a serial number to be combined with the time data is performed based on an instruction from the server controller 22. Where the encoder has a serial number as internal data, it is used; otherwise, a serial number is given through the keyboard or the like.

Figure 4:
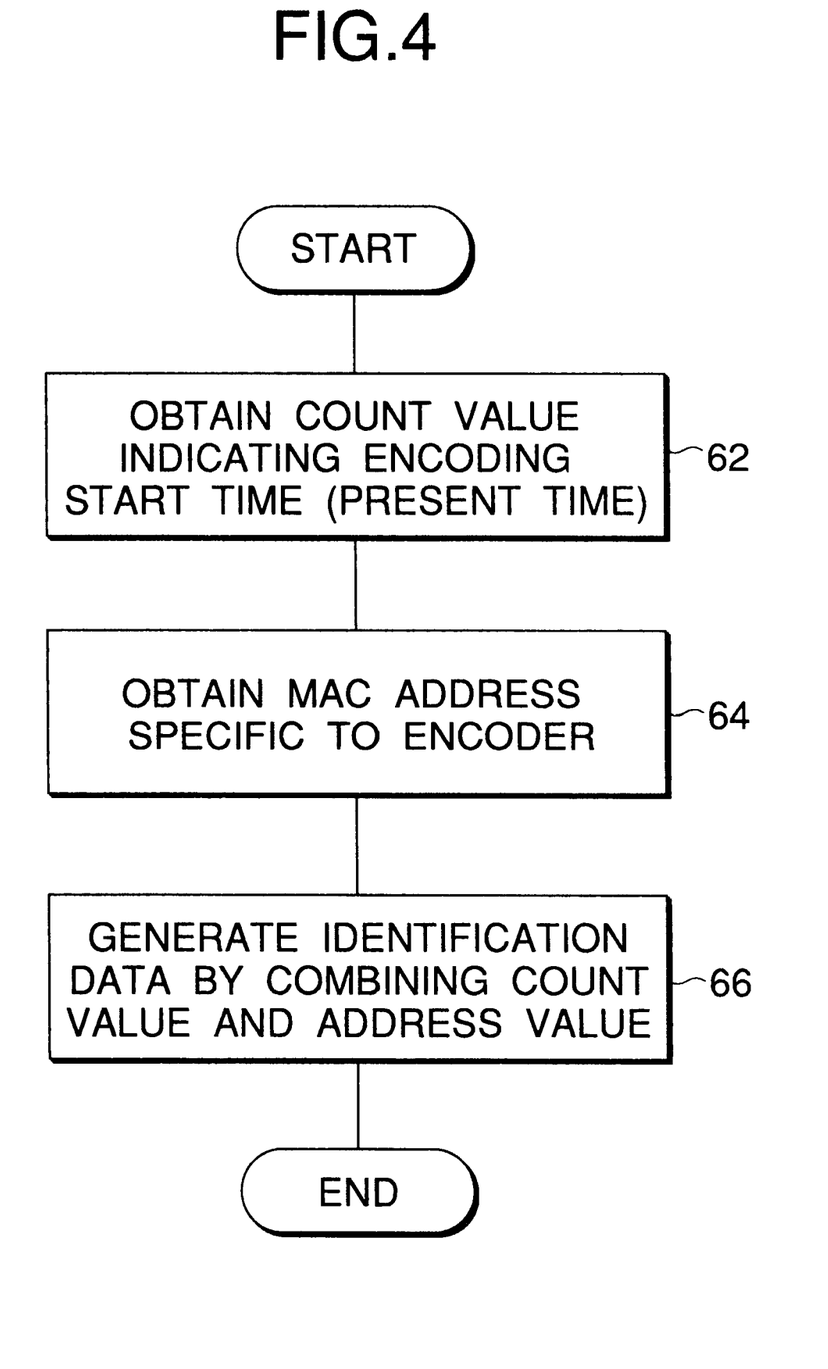
FIG. 4 is a flowchart showing an example of a process of generating identification data.

FIG. 4 is a flowchart for automatically generating identification data ID having the above structure. A count value indicating an encoding start time point is stored at step 62. At step 64, a MAC address that is serial data specific to the encoder used is stored. At step 66, these two kinds of values are combined into single identification data ID.

Figure 5:
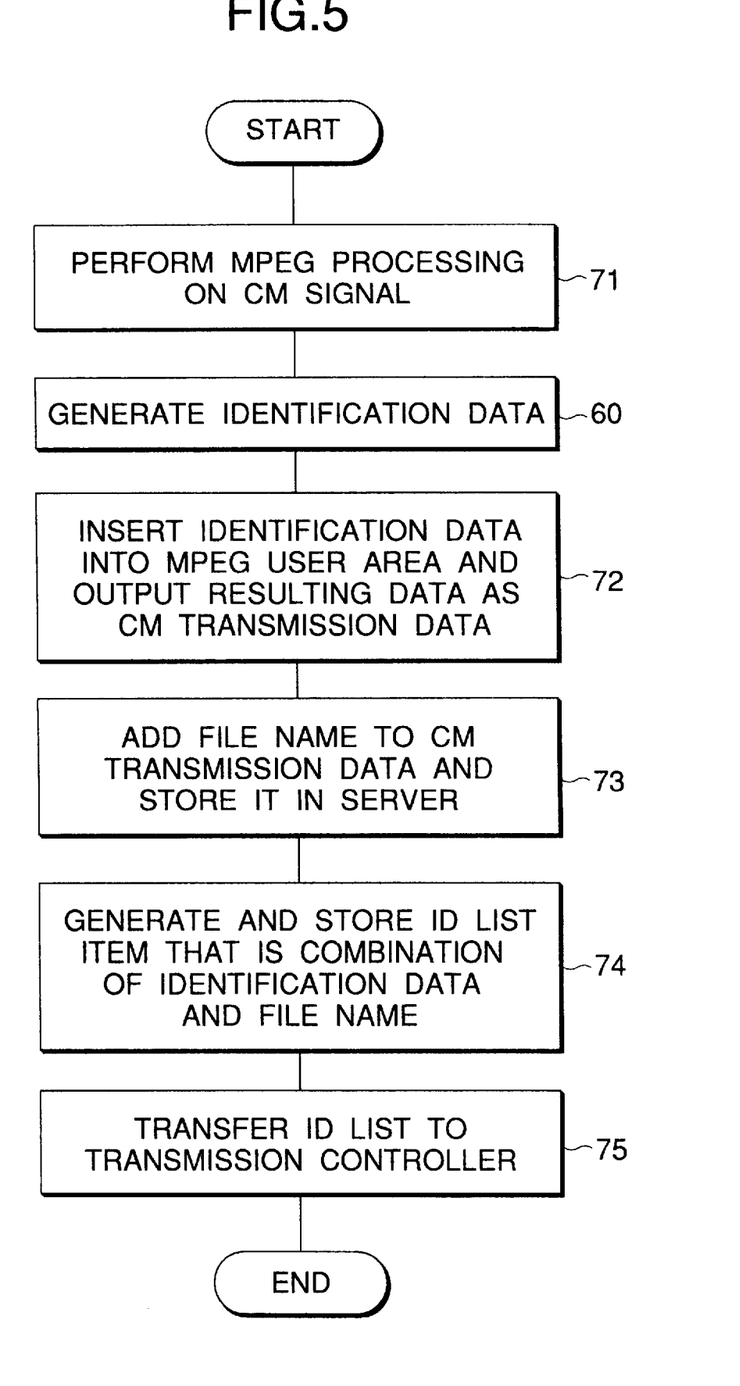
FIG. 5 is a flowchart showing an example of a process of storing CM transmission data in a server and a process of generating an ID list.

FIG. 5 is a flowchart showing an example of the above-described processes of storing CM transmission data and an ID list. This flowchart is directed to only the internal process. First, a CM signal is compression-coded (MPEG processing) at step S71 and, at the same time, specific identification data ID is automatically generated at step 60. Step 60 was described above in connection with FIG. 4. At step 72, the identification data ID is inserted into the predetermined area of coded data to form CM transmission data, which is sent to the server storage device 20.

It is assumed in this embodiment that the time data and the MAC data are combined with each other automatically in the identification data generating means 18. Alternatively, they may be combined in response to an instruction from the server controller 22.

At step 73, a file name that is input through the keyboard 24 is added to the CM transmission data, and the resulting CM transmission data is stored in the storage device 20. At step 74, an ID list item is generated by adding the same file name to the identification data ID, and then stored in the RAM 28. At step 75, the ID list is transferred to the transmission controller 40 and stored in the RAM 46.

Figure 6:
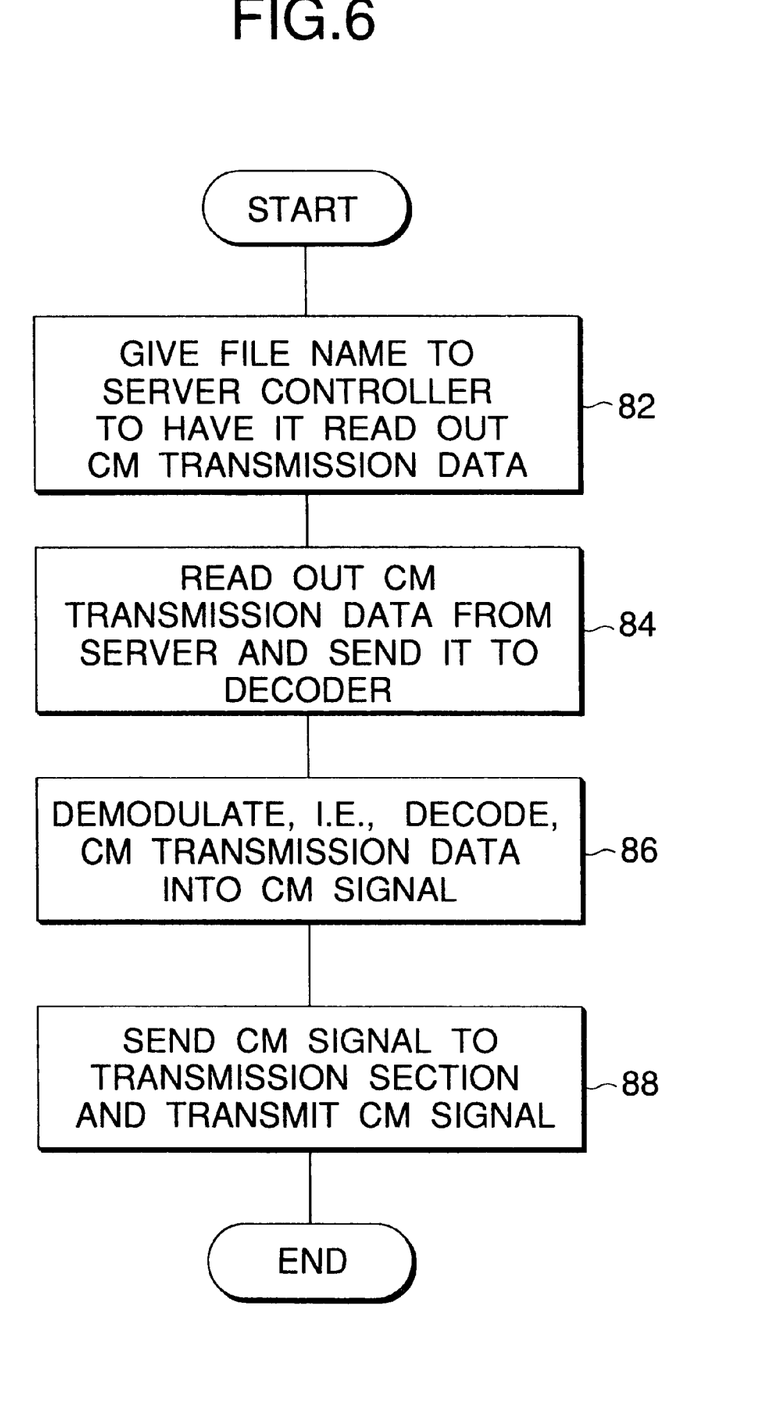
FIG. 6 is a flowchart showing an example of a process of transmitting a CM signal.

FIG. 6 shows an example process performed on the CM signal transmission side. At step 82, upon starting of program transmission software, a file name is given to the server controller 22 to have it read out CM transmission data. At step 84, the storage device 20 is rendered in a readout state in response to the above instruction and read-out CM transmission data is supplied to the decoder 48. At step 86, the CM transmission data is demodulated, i.e., decoded, by the decoder 48 into a CM signal. At step 88, the CM signal is supplied to the program transmission section 50, which transmits the CM signal.

Since in the above manner a program to be aired actually is decoded and the associated identification data ID is extracted, it is assured in a reliable manner that the program has been transmitted. A material that can be used for showing sponsors grounds of charging can be produced by outputting data of programs that have been transmitted by the transmission controller 40 and making a list of those programs.

Figure 7:
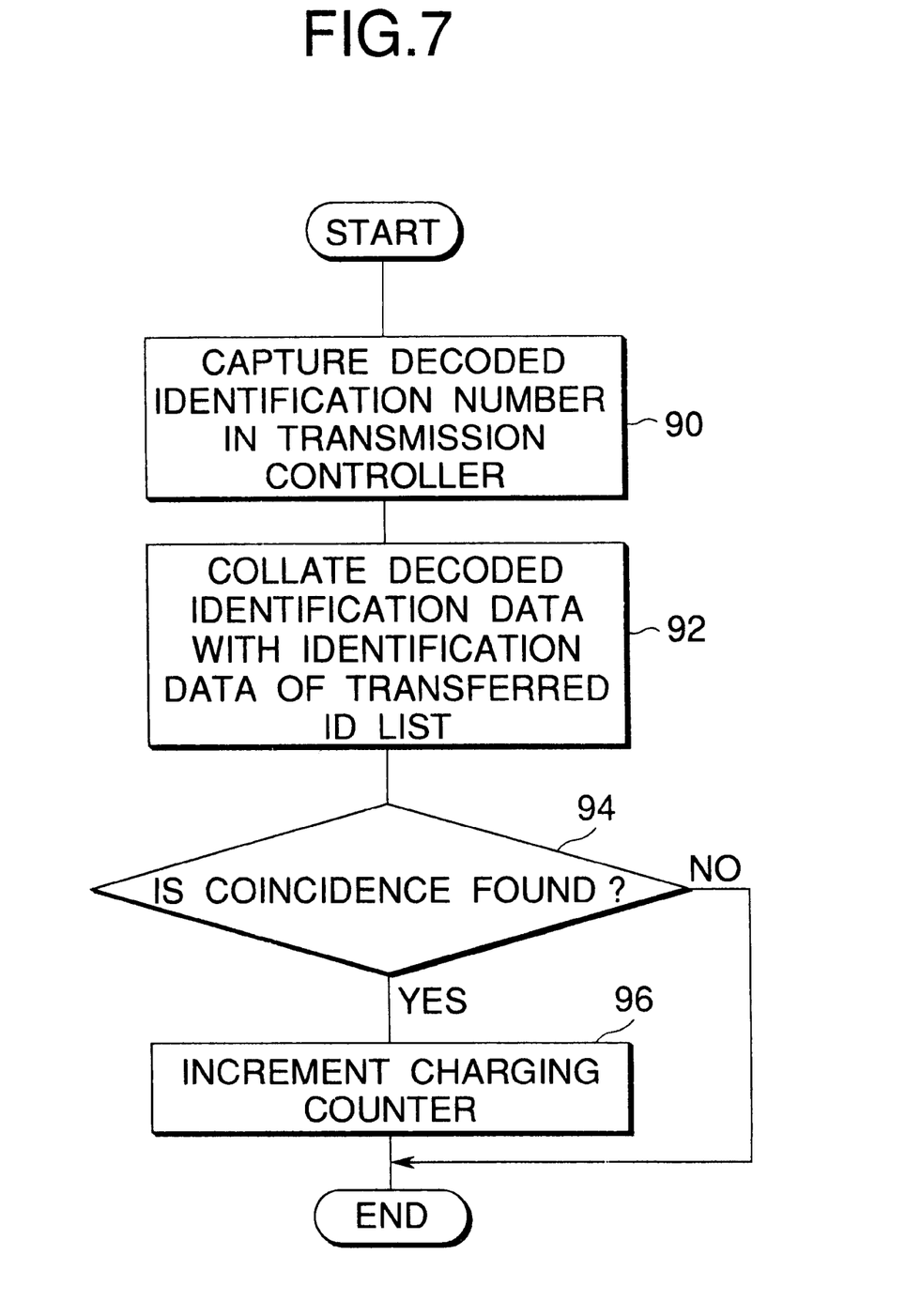
FIG. 7 is a flowchart showing an example of a process of collating identification data.

The reliability of data of transmitted programs can be increased by collating identification data ID in the following manner. FIG. 7 shows an example process of collating identification data ID. Upon starting of a collation program, identification data ID associated with a CM signal that is output from the decoder 48 is captured by the transmission controller 40 at step 90. At step 92, the identification data ID associated with the CM signal is collated with identification data IDs in the ID list that has been transferred to the transmission controller 40. At step 94, it is judged whether a coincidence is found. If a coincidence is found, the charging counter is incremented at step 96. If no coincidence is found, the counter is not incremented. Due to a trouble in the system caused by an unexpected event such as a power failure or an accident, an erroneous operation, etc., there may occur a case that actually aired programs are different from scheduled ones on a transmission list. Programs that have been subjected to such an event are not included in chargeable programs.

Although in the above embodiment the encoding start time is used as the time indicating a encoding process, the encoding end time or some other time of a encoding process may be used as the time data.

Although the above embodiment is directed to the case of processing commercial messages, it is just an example and movies and other kinds of programs may also be processed. Further, the invention can be applied to a case of processing a program including only video data or audio data.

What is claimed is:

1. A program data transmission checking apparatus for checking whether program data has been transmitted, comprising:

identification data generating means for generating unique program identification data;

encoding means for encoding program data together with the program identification data corresponding to the program data;

decoding means for decoding encoded data that is output from the encoding means; and output means for outputting decoded program identification data that is output from the decoding means, said program identification data includes time data and serial data to identify said encoding means.

2. The program data transmission checking apparatus according to claim 1, wherein said time data relates to an encoding process and said serial data identifies said encoding means used in said encoding process.

3. The program data transmission checking apparatus according to claim 1, further comprising input means for allowing external input of program data and program identification data corresponding to the program data.

4. An apparatus for generating identification data to be used for checking whether program data transmission information coincides with actually transmitted program data, comprising:

identification data generating means for generating unique program identification data;

first output means for outputting the program identification data to encoding means for encoding program data together with the program identification data corresponding to the program data, said program identification data includes time data and serial data to identify said encoding means; and second output means for outputting the program identification data to transferring means for transferring the program identification data generated by the identification data generating means.

5. A comparing apparatus for checking whether program data transmission information coincides with actually transmitted program data, comprising:

first input means for receiving data that is output from transferring means for transferring program identification data generated by identification data generating means for generating unique program identification data;

second input means for receiving data that is output from decoding means for decoding encoded data that is output from encoding means for encoding program data together with the program identification data corresponding to the program data means, said program identification data includes time data and serial data to identify said encoding means; and comparing means for comparing the program identification data that has been transferred via the transferring means with decoded program identification data that is output from the decoding.

6. A program data transmission checking method for checking whether program data transmission information coincides with actually transmitted program data, comprising the steps of:

generating unique program identification data;

transferring the program identification data;

encoding program data together with the program identification data corresponding to the program data to produce encoded data, said program identification data includes time data and serial data to identify an encoding means;

decoding the encoded data to produce decoded program identification data; and comparing the transferred program identification data with the decoded program identification data.

7. A program data transmission checking apparatus for checking whether program data transmission information coincides with actually transmitted program data, comprising:

identification data generating means for generating unique program identification data;

encoding means for encoding program data together with the program identification data corresponding to the program data, said program identification data includes time data and serial data to identify said encoding means;

decoding means for decoding encoded data that is output from the encoding means;

transferring means for transferring the program identification data generated by the identification data generating means; and comparing means for comparing the program identification data that has been transferred via the transferring means with decoded program identification data that is output from the decoding means.

* * * * *